(12) United States Patent
Nawrocki

(10) Patent No.: US 11,128,680 B2
(45) Date of Patent: Sep. 21, 2021

(54) AI MEDIATED CONFERENCE MONITORING AND DOCUMENT GENERATION

(71) Applicant: Fiduciary.ai Inc., Westport, CT (US)

(72) Inventor: John K. Nawrocki, Norwalk, CT (US)

(73) Assignee: FIDUCIARY.AI INC., Westport, CT (US)

( * ) Notice: Subject to any disclaimer, the term of this patent is extended or adjusted under 35 U.S.C. 154(b) by 0 days.

(21) Appl. No.: 15/915,195

(22) Filed: Mar. 8, 2018

(65) Prior Publication Data

US 2019/0028520 A1 Jan. 24, 2019

Related U.S. Application Data

(60) Provisional application No. 62/535,329, filed on Jul. 21, 2017.

(51) Int. Cl.
| | |
|---|---|
| *G06F 15/16* | (2006.01) |
| *H04L 29/06* | (2006.01) |
| *G06Q 50/18* | (2012.01) |
| *G06N 20/00* | (2019.01) |
| *G06F 16/635* | (2019.01) |
| *G06F 40/205* | (2020.01) |

(52) U.S. Cl.
CPC ......... *H04L 65/403* (2013.01); *G06F 16/635* (2019.01); *G06F 40/205* (2020.01); *G06N 20/00* (2019.01); *G06Q 50/18* (2013.01); *H04L 65/1073* (2013.01)

(58) Field of Classification Search
CPC . H04L 65/403; H04L 65/1073; G06F 40/205; G06F 16/635; G06N 20/00; G06N 3/04; G06N 3/126; G06N 5/025; G06N 20/10; G06N 7/005; G06Q 50/18
See application file for complete search history.

(56) References Cited

U.S. PATENT DOCUMENTS

| | | | | |
|---|---|---|---|---|
| 6,714,939 | B2 * | 3/2004 | Saldanha | G06F 40/14 |
| 2012/0161971 | A1 * | 6/2012 | Nasir | G07C 1/10 |
| | | | | 340/573.4 |
| 2015/0007056 | A1 * | 1/2015 | Cohen | H04L 65/403 |
| | | | | 715/753 |
| 2015/0371195 | A1 * | 12/2015 | Boss | G06Q 10/1095 |
| | | | | 705/7.19 |
| 2018/0101281 | A1 * | 4/2018 | Nelson | G06F 3/04817 |
| 2018/0212790 | A1 * | 7/2018 | Jacobson | G06Q 10/103 |
| 2018/0240038 | A1 * | 8/2018 | Adibowo | G06F 16/24578 |

* cited by examiner

*Primary Examiner* — Anh Nguyen
(74) *Attorney, Agent, or Firm* — Leason Ellis LLP

(57) ABSTRACT

Methods and systems of the invention relate to automation of certain fiduciary tasks using machine learning techniques, including generation of corporate meeting minute documents in compliance with legal and organizational requirements. In part, these methods and systems use pre-trained machine learning based data model. The invention monitors and can proactively control meetings to ensure agenda completion among meeting participants and to create meeting minutes, among other tasks.

8 Claims, 8 Drawing Sheets

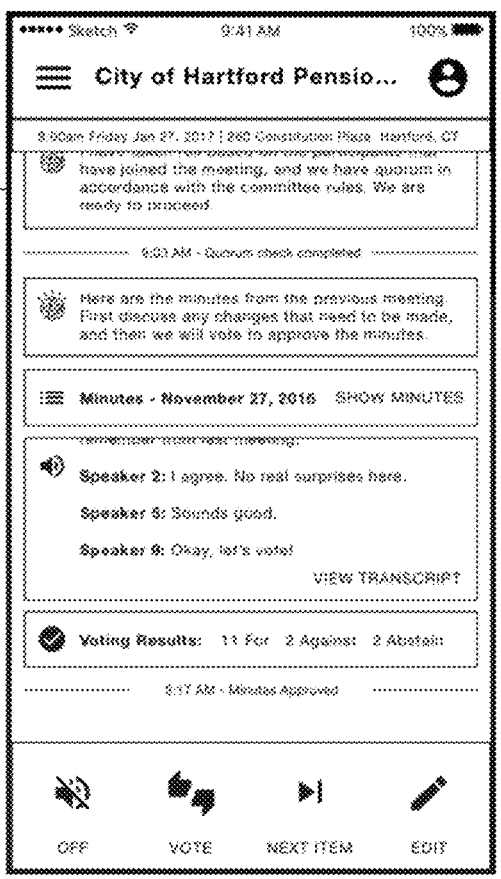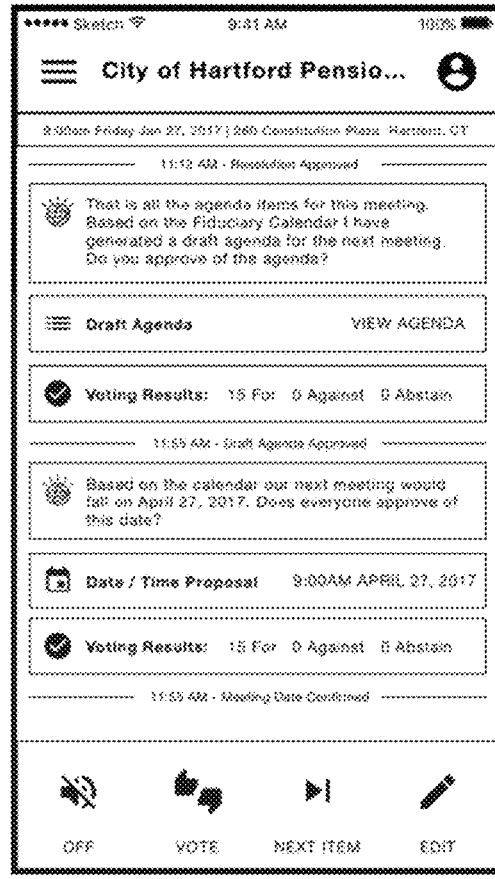
FIG. 8

AI MEDIATED CONFERENCE MONITORING AND DOCUMENT GENERATION

CROSS-REFERENCE TO RELATED APPLICATIONS

This application claims priority to U.S. Provisional Patent Application Ser. No. 62/535,329, of the same title, filed on Jul. 21, 2017, which is hereby incorporated by reference as if set forth in its entirety herein.

FIELD OF THE INVENTION

Embodiments of the invention relate to automation of certain fiduciary tasks using machine learning techniques, including generation of corporate meeting minute documents in compliance with legal and organizational requirements.

BACKGROUND OF THE INVENTION

Corporate board members often meet to discuss issues of corporate compliance and agendas. During these meetings, meeting minutes or a summary of the topics addressed must be generated and approved by the board members as mandated by various federal and state laws and regulations. For example, the administration of company benefits such as 401(k) plans needs to be conducted in compliance with relevant federal regulations (e.g., quarterly board meetings need to be conducted) to ensure that the plans are accorded the associated tax benefits and are meeting the requirements of labor laws. However, as the numbers of corporate or organizational boards that an individual sit upon increases, so too does the difficulty in obtaining timely and accurate meeting minutes. As such, there exists a need in the art to mediate the communications of corporate board members and generate meeting minutes automatically based on the content of the conference and a set of rules or other heuristics governing the content and formatting of such meeting memorialization.

Furthermore, the complexity of corporate board decisions has steadily increased over the years. Years ago, a typical board meeting would last no more than one hour. In these relatively short meetings, board members would evaluate different, but highly similar fiduciary strategies and generate relatively straight forward meeting minutes. Currently, board members can spend up to a working day in a single meeting. Coupled with the increased length is an increase in the complexity of fiduciary strategies, options and products that the board members often called upon to consider. The complexity of the meeting itself translates into meeting minutes that are complex and hard to parse for relevancy, actionable information and compliance with regulations. The minutes often take a considerable amount of time and resources to produce. Thus, what is needed in the art is a system that can suitably and efficiently memorialize and organize board meeting discussions.

SUMMARY OF THE INVENTION

Embodiments of the invention are directed towards systems, methods and computer program products for evaluating and parsing communication streams and generating documents from the parsed communication streams that are formatted to satisfy specific corporate reporting requirements. For example, a computer implemented method is provided that includes the steps of accessing, with a conference monitor, at least one agenda data object from a database, wherein the agenda data object includes a plurality of agenda tasks. The conference monitor is further configured to connect to at least one virtual conference room. Upon connection of the participants and the conference monitor, the conference monitor is further configured to register each of a plurality of participants accessing the at least one virtual conference room. Upon registration of each participant, the conference monitor evaluates and parses data exchanged by each of the plurality of participants accessing at least one virtual conference room and compares the parsed data with the agenda data. Upon conclusion of a conference, the conference monitor determines if each agenda task has been completed and when done so, generates a textual summarization of the monitored data for output in proper format to a data storage location.

In some embodiments, the plurality of user devices includes at least one administrative user device and at least one participant device, and in the event that the determination, based on the comparison using the pre-trained machine learning based data model, is that a given agenda task has failed to complete, at least the administrative user device is prompted to further monitor data exchanges by the plurality of participants and repeating the comparing and determining steps until the given agenda task has been completed.

In some implementations the registering further comprises prompting each participant to verbally indicate their presence in the virtual conference room and comparing each verbal indication to one or more stored voice profiles stored in a database of anticipated users and identifying each participant based on a match between the verbal indication and the one or more stored voice profiles.

Embodiments of the present invention include a system that comprises one or more processors, and a memory including instructions, which when executed by the one or more processors causes the one or more processors to perform a method. The method includes accessing, at least one agenda data object from a database, wherein the agenda data object includes a plurality of agenda tasks, connecting, to at least one virtual conference room, registering, each of a plurality of participants accessing the at least one virtual conference room, monitoring data exchanges by each of the plurality of participants accessing the at least one virtual conference room, comparing the monitored data exchanges with the agenda data, determining if each agenda task has been completed, generating a textual summarization of the monitored data exchange, and outputting the textual summarization.

Embodiments of the present invention also include a method of memorializing fiduciary meeting among a plurality of participants. The method comprises receiving a transcription text of a fiduciary meeting discussion among the plurality of participants, parsing the transcription text using natural language processing, determining a template for organizing the parsed text, filling the template with the parsed text according to rules determined at least in part using a machine learning model applied to previously generated fiduciary meeting documents, and generating a minutes document that memorializes the fiduciary meeting.

In some embodiments, the method of memorializing a fiduciary meeting includes, prior to parsing, applying classifiers to the received transcription text based on information related to the fiduciary meeting. The classifiers can include a meeting committee type, and an identity of registered participants.

In further embodiments, the method of memorializing a fiduciary meeting includes receiving corrections from at least one of the plurality of participants for modifying the generated minutes document. Advantageously, the machine learning model can be trained based on the corrections to the minutes document.

In some implementations, the generated minutes document includes transcriptions of speech from the plurality of participants, voting results for resolutions, and a meeting agenda. The step of parsing can be performed, at least in part, using heuristics based on information related to the fiduciary meeting. The information related to the fiduciary meeting can include, among other data, a meeting committee type.

In some embodiments, the method of memorializing a fiduciary meeting includes determining whether a quorum condition has been met for conducting the fiduciary meeting. If a quorum has not been achieved, input can be received from the plurality of participants to reorganize an agenda of the fiduciary meeting if a quorum has not been achieved and the meeting agenda is can be changed based on the received input. In one alternative, input can be received from the plurality of participants to reschedule the fiduciary meeting and the meeting can be rescheduled using a fiduciary calendar based on the received input received input. In another alternative, input can be received from the plurality of participants that at least one of the participant has a proxy for an absent committee member. In this event, it is determined whether the proxy is legitimate and an announcement is automatically made that a quorum has been met if the proxy is sufficient to meet the quorum condition.

BRIEF DESCRIPTION OF THE DRAWINGS

Embodiments of the invention are illustrated in the figures of the accompanying drawings which are meant to be exemplary and not limiting, in which like references are intended to refer to like or corresponding parts, and in which:

FIG. 8 illustrates two example wireframe of minute minutes output by the Minute Maker according to an embodiment of the present invention.

DETAILED DESCRIPTION OF CERTAIN EMBODIMENTS OF THE INVENTION

By way of overview, various embodiments of the systems, methods and computer program products described herein are directed towards capturing communication data and generating documentation from the captured communication stream. For ease of explanation, and in no way limiting to the implementations described herein, the communication stream can include both audio and textual streams of data. In alternative configurations, the communication stream can include visual data as well.

User Device(s)

Figure 1:
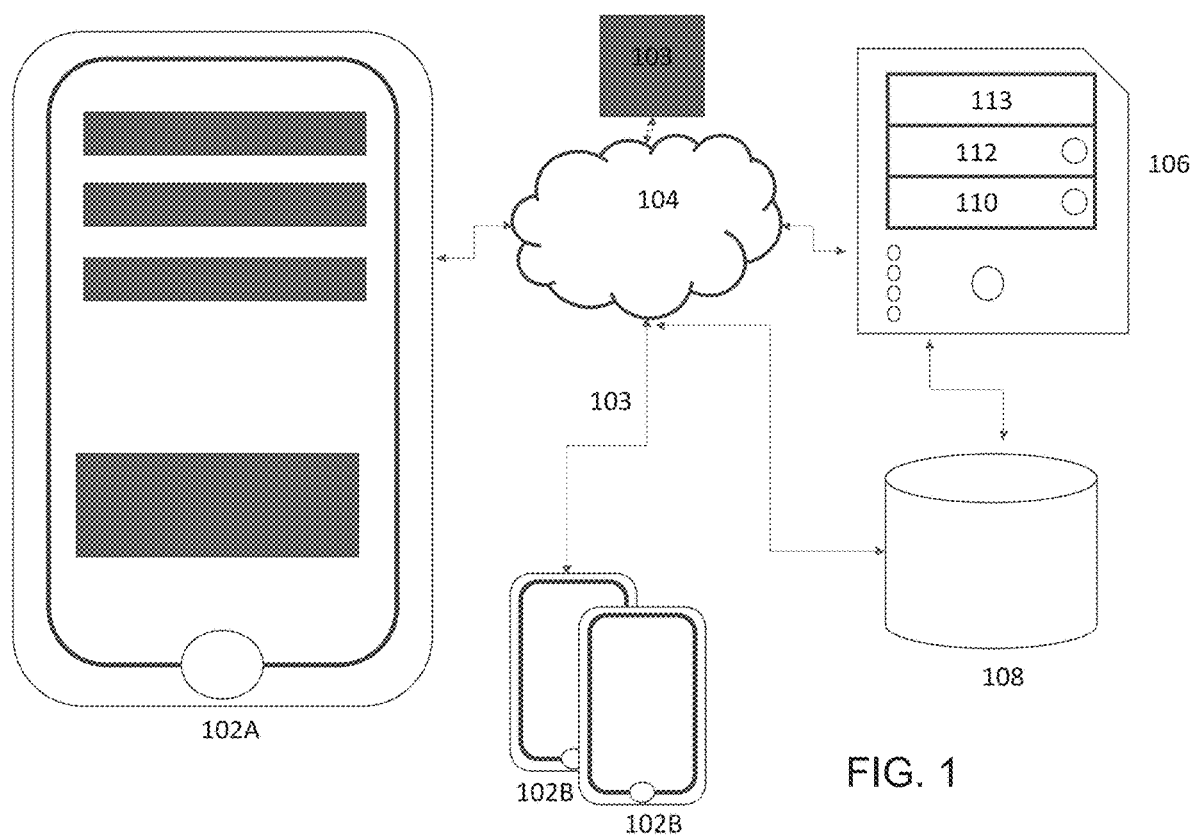
FIG. 1 is a block diagram of a system for extracting data from communication streams and generating custom analysis thereof according to one embodiment of the present invention.

As shown in FIG. 1, one or more user devices 102A, 102B are connected to one another via communication or data channels. An administrative user device 102A is connected to one or more participant user devices 102B via a network. For example, the administrative user device 102A and the one or more participant user devices 102B are connected to one another via the internet 104. In alternative arrangements, the administrative user device 102A and one or more participant user devices 102B are connected to one another directly, such as though a direct communication application. In a further implementation, the administrative user device 102A and one or more participant user devices 102B are connected to one another through a remote server, a communication bridge, telephone exchange, modem, electronic communication exchange, chat room, a conference bridge, web portal, or other network gateway.

According to one embodiment, the administrative user device 102A and one or more participant user devices 102B are desktop or workstation class computers that execute a commercially available operating system, e.g., MICROSOFT WINDOWS, APPLE OSX, UNIX or Linux based operating system. In accordance with further embodiments, the administrative user device 102A and one or more participant user devices 102B are portable computing devices such as a smartphone, wearable computer or tablet class device. For example, the administrative user device 102A and one or more participant user devices 102B can be one of an APPLE IPAD/IPHONE mobile devices, ANDROID mobile devices or other commercially available mobile electronic devices configured to carry out the processes described herein. In other embodiments, the administrative user device 102A and one or more participant user devices 102B comprise any commercially available, custom or non-standard communication hardware, device or device configuration.

In one arrangement, the administrative user device 102A and one or more participant user devices 102B are connected to one another through a telephone conference room 103 or virtual conference room 103. In a further example, the telephone virtual conference room 103 includes multiple participants that have been placed into teleconference. In a specific implementation, at least four (4) individual devices may connect with or to the virtual conference room 103 from one or more locations.

In a particular arrangement, the virtual conference room 103 is a telephone exchange based virtual conference room 103. In another arrangement, the virtual conference room is a Voice Over Internet Protocol (VOIP) based virtual conference room 103. In a further arrangement, the virtual conference room 103 is an audio data stream communicated via a network, such as the internet or a local intranet.

Conference Management Appliance

A conference management appliance 106 is also configured to connect to the virtual conference room 103. As shown in FIG. 1, the conference management appliance 106 connects to the virtual conference room 103 through the internet 104. In another implementation, the conference management appliance 106 connects to the administrative user device 102A and one or more participant user devices 102B independently. In a configuration where the administrative user device 120A is hosting the conference, the conference management appliance 106 is configured to connect directly to the host user device(s) 102A to access and/or participate in the conference.

In a particular implementation, the conference management appliance 106 is a remote server or computer having one or more processors 113 configured to implement or execute code. In one implementation, the conference management appliance 106 may comprise one or more servers, computers, micro-computer(s), GPU, or field programmable gate arrays operating alone or in concert with one another or a collection of components, circuits, network adaptors, and remote and local storage. In a further implementation, the conference management appliance 106 operates as a collection of such devices, network adaptors and interfaces(s) operating in a distributed, but cooperative, fashion. For example, as an array of computing elements, computer-on-chip(s), prototyping devices, "hobby" computing elements, home entertainment consoles and/or other hardware.

In a further implementation, the conference management appliance 106 and administrative and participant user device(s) 102A, B include primary computer memories, such as a read only memory (ROM) and/or a random-access memory (e.g., a RAM). The computer memories may also comprise secondary computer memory, such as magnetic or optical disk drives or flash memory, that provide long term storage of data. In accordance with one or more embodiments, the memory comprises one or more volatile and non-volatile memories, such as Programmable Read Only-Memory ("PROM"), Erasable Programmable Read-Only Memory ("EPROM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as by using removable media cards or similar hardware modules. In one or more embodiments, the memory of the conference management appliance 106 and user device(s) 102A, B provides for storage of application program and data files when needed by one or more processors incorporated therein. For instance, one or more read-only memories provide program code that the processor reads and implements at startup or initialization, which may instruct the processor as to specific program code from the persistent storage device to load into RAM at startup.

For instance, the conference management appliance 106 is equipped with, or is in communication with, a persistent storage device 110 that is operative to store the operating system in addition to one or more of software modules 112, such as those described herein to access the communication stream and evaluate the contents thereof. In one embodiment, the modules utilized by the conference management appliance 106 comprise software program code and data that are executed or otherwise used by one or more processors 113 of the conference management appliance 106 thereby causing the conference management appliance 106 to perform various actions dictated by the software code of the various modules. Each module is programmed in a manner that would be well understood by those of skill in the art to achieve the functions described herein.

The conference management appliance 106 is configured to implement or execute a number of different application modules. One of the applications modules comprises an AI Engine that can implement one or more of a trained neural network, artificial neural network, Bayesian networks, Deep Learning, Rule Based learning, Genetic Algorithms, Decision Tree, Support vector network, or any combination thereof or one or more additional machine learning applications suitable for evaluating communications between participants. This module enables the conference management appliance 106 to evaluate data according to one or more machine learning or natural language processing principals and make to predictions, conclusions or recommendations based on the evaluation. For example, using one or more natural language processing models, the conference management appliance 106 is configured to extract summaries from conversations, extract key words or tokens relevant to a particular topic, determine the topic under discussion or otherwise evaluate the communication stream.

In accordance with certain embodiments, the conference management appliance 106 is in communication with a persistent data store 108 that is located remote from the conference management appliance 106 such that the conference management appliance 106 access the remote persistent data store over a computer network, e.g., the Internet, via a network interface, or directly. In a further implementation, the conference management appliance 106 implements communication frameworks and protocols that are well known to those of skill in the art to access and retrieve data from the persistent storage device 108.

The persistent storage device 108 is a database connected to the conference management appliance 106 via a server or network interface and provides additional storage or access to user data, community data, or general-purpose files or information. The physical structure of the database 108 can be embodied as solid-state memory (e.g., ROM), hard disk drive systems, RAID, disk arrays, storage area networks ("SAN"), network attached storage ("NAS") and/or any other suitable system for storing computer data. In addition, the database 108 can comprise caches, including database caches and/or web caches. Programmatically, the database 108 can comprise flat-file data store, a relational database, an object-oriented database, a hybrid relational-object database, a key-value data store such as HADOOP or MONGODB, in addition to other systems for the structure and retrieval of data that are well known to those of skill in the art.

Conference Monitoring

In one non-limiting example, the conference management appliance 106 is configured to access from the database 108 a stored agenda for the conference. The stored agenda can include topics of discussion to be addressed or specific resolutions to be voted on during the conference. Additionally, the agenda can include specific or general topics of interest to the users or corporate management. In a further implementation, the database contains one or more rules or models to evaluate or process data acquired by the conference management appliance 106. For example, the rules or models include natural language processing modules configured to parse or process data acquired by the conference management appliance 106. For example, the model represents a heuristic analysis based on training data sets that is configured to evaluate textual data and extract specific keywords or features of the textual data for evaluation purposes.

In yet a further implementation, the database 108 contains rules or other information useful in evaluating one or more different types of conferences or meetings taking place between the users. The rules stored or accessible to the conference management appliance 106 are used to evaluate the data from the communication stream and determine compliance parameters, concepts, or other indications. For instance, one set of rules is used when the conference is 401(k) administration meetings while another set of rules is used in general corporate committee meetings for a corporate board of directors.

Fiduciary Management Modules

Figure 2:
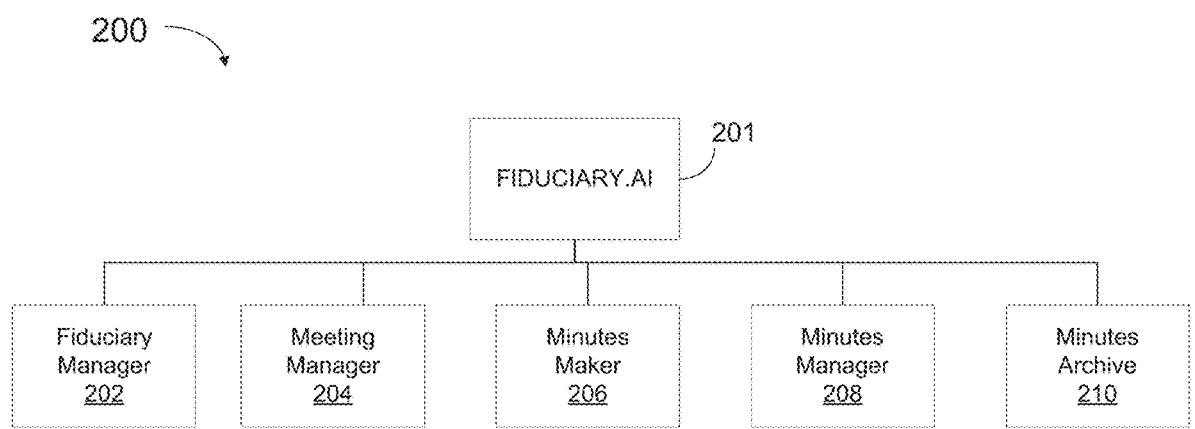
FIG. 2 is a block diagram depicting a suite of modules that governs fiduciary management according to an embodiment of the present invention.

The conference management appliance 106 is configured to execute a suite of related modules which are applications and associated libraries that govern the interrelated aspects of fiduciary management. An embodiment of the suite of modules for fiduciary management is illustrated in FIG. 2. The suite of modules 200 can be accessed from user devices 102, B via a portal or landing page Fiduciary.ai 201, or can be invoked directly via conference management appliance 106. From the landing page, several modules can be accessed including a Fiduciary Manager 202, a Meeting Manager 204, a Minutes Maker 206, a Minutes Manager 208, and Fiduciary Archive module 210. The Fiduciary Manager 202 includes software code for governing the fiduciary process as a whole. For example, the Fiduciary Manager 202 creates a Fiduciary Calendar that assigns dates for all required meetings and conferences, manages board committees, membership, contact information membership, and manages permissions for edits, changes to workflow and so forth.

The Meeting Manager 204 provides a control interface for viewing, editing and approving particular meetings and committees. For example, the Meeting Manager 204 allows operators to configure the preparation of meeting minutes, the manner in which committee members are to contacted and reminded of scheduled meetings (e.g., invites and conference call information), and provides an interface for controlling the conduct of meetings and conferences in real time. The Meeting Manager 204 also monitors the attendance of meetings. For example, the participant Meeting Manager accesses the MAC addresses of each participant user device and compares the MAC addresses to metadata regarding the participants for the scheduled meeting. For example, the MAC-48 address of the administrative user device 102A and one or more participant user devices 102B are identified. The identified MAC addresses are compared to databases including information expected participants and the participant is verified. In addition, the Meeting Manager 204 sets an agenda and identifies resolutions to be decided upon in an upcoming meeting based on data concerning the meeting in the Fiduciary Calendar, including the committee type, and evaluation of prior minutes.

The Minute Maker 206 employs an artificial intelligence engine (AI engine) to analyze received text and audio streams related to a particular meeting, and organizes the received data in a document referred to as the "Minutes" of the meeting. The Minutes Maker 206 uses artificial intelligence (i.e., a machine learning model) to learn from past committee meetings minutes prescribed ways for organizing specific content normally discussed during similar committee meetings. Importantly, Minutes output by the Minute Maker can be edited by personnel prescribed by the Fiduciary Manager. The personnel may be participants in the meeting via user devices 102 A, B. The edits to the Minutes are entered into the Meeting Archive 210 and can be used by the Minute Maker in its learning process in subsequent procedures, so that the Minute Maker, over time, learns from earlier errors and produces output that tends to come closer to a directly-approvable set of Minutes. FIG. 8 shows two example wireframes 802, 804 of meeting minutes output by the Minute Maker 206 and formatted for a user device. As shown, the minutes can be personalized for different participants, and specific items such as voting results and draft agendas can be highlighted by bracketing them off from other text. The minutes displayed in wireframes 802, 804 are merely exemplary however, and other formats, styles, icons and so forth can be used in variety of implementations.

Returning to FIG. 2, the Minute Maker 206 can perform a number of additional functions. For example, upon commencement of discussion regarding an agenda item (e.g. discussion on a given topic, vote, etc.) the Minute Maker module 206 is configured to parse the communication between participants. In a particular implementation, the Minute Maker 206 converts audio data (e.g. voice communications) into text data. In an alternative implementation, administrative user device 102A and one or more participant user devices 102B are configured by code to parse the users' voice into text. In a further implementation, the converted text is associated with time stamps or other metadata and is sent to the conference management appliance 106. The text and/or metadata can be added into a single record of the conference using the time stamp or other metadata to organize the document. The AI engine of the Minute Maker can also be used to generate and enhance meeting agendas. For example, agendas can be generated based on natural language processing of the meeting minutes.

After Minutes have been generated by the Minute Maker 206, the Minutes Manager 208 manages the following workflow involved in review, editing, discussion and approval of the final Minutes by the participants in the meeting. The Minutes Manager ensures 208 that the participants collaborate effectively and in an organized way to achieve final short and long versions of the Meeting Minutes. The Fiduciary Archive 210 stores all long and short versions of approved meetings of all committee board meetings. As noted above, the Fiduciary Archive 310 provides the large quantity of data that enables the AI engine to construct Minutes that comply with prescribed models and fiduciary requirements.

The suite of modules 200 functions together to prepare both the organizational appliance 106 and user devices 102A/B for upcoming meetings. The Fiduciary Calendar drives the sequence of events that are followed. For example, upon identification of a meeting of a particular committee that is upcoming, the Fiduciary Manager 202 can activate the Meeting Manager 204 to reserve a virtual conference room 103 and notify relevant committee members of the date, time, relevant agenda, conference room ID, etc. On the date and time a meeting is to take place, the Meeting Manager and Minute Maker are activated to monitor the virtual (or actual) conference, determine the participants that are present, and evaluate the participant input.

It will be appreciated that in an alternate embodiment, the administrative user device 102A and one or more participant user devices 102B are configured by a processor therein to execute the suite of modules via the Fiduciary.ai portal 201. The Meeting Manager 204, invoked using a local application on user devices 102A/102B, can configure the administrative user device 102A and one or more participant user devices 102B to access the virtual conference room 103 and exchange data with one another during the conference. In an alternative configuration, the Fidiciary.ai is a remotely accessible application, such as a web portal or web application that is accessible through an application native to the administrative user device 102A and one or more participant user devices 102B, such as a web browser.

While the foregoing examples make use of a meeting application, alternative configurations are also envisioned where the administrative user device 102A and one or more participant user devices 102B connect to a virtual conference room 103 or bridge and do not utilize the Fiduciary.ai suite 201 initially to exchange data. Instead, the Maker Minute Module AI engine can be brought in through conventional communication methods to mediate the meeting after communication has been established.

Figure 3:
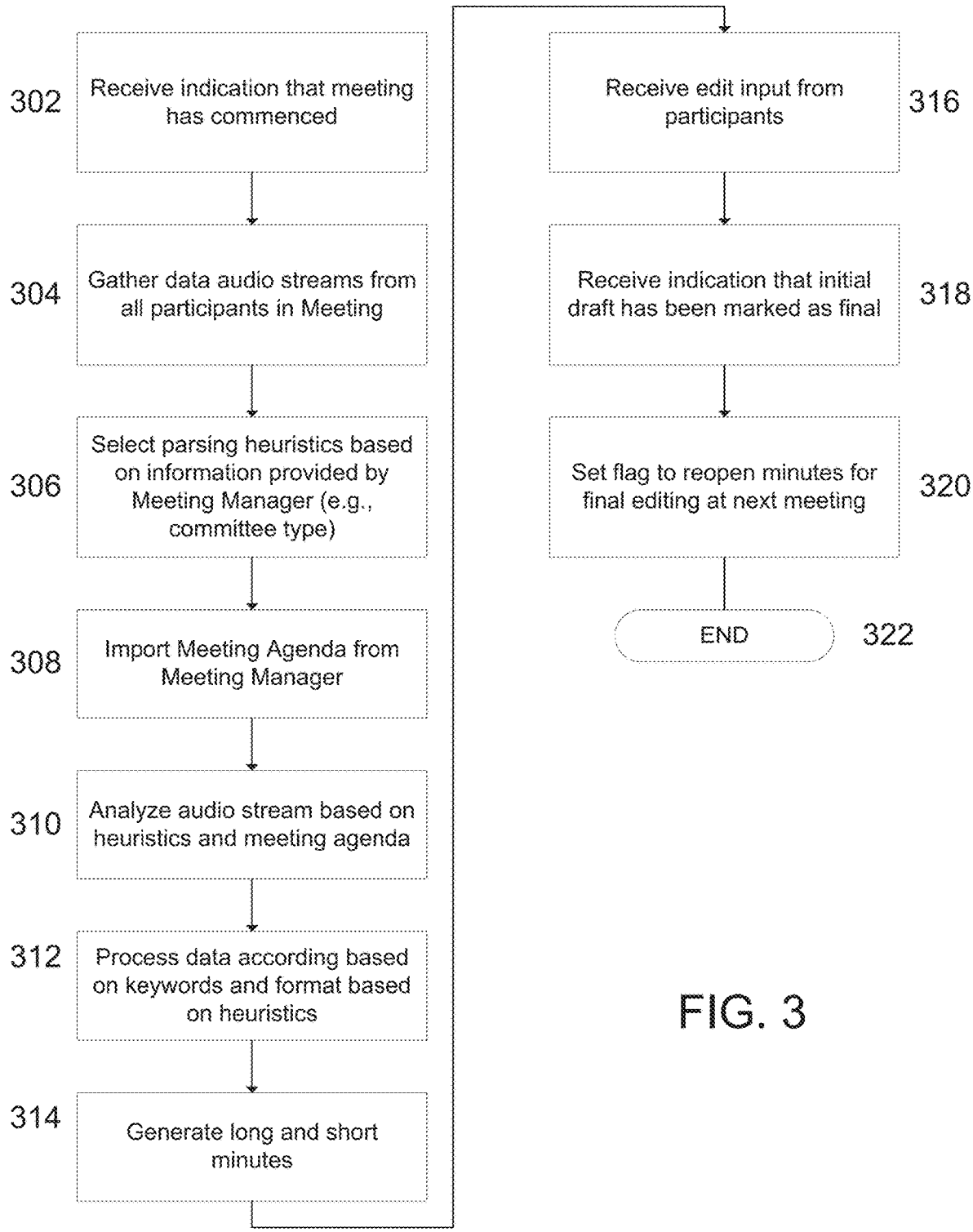
FIG. 3 is a flow chart of an example of operation of the Minute Maker module during a meeting according to an embodiment of the present invention.

FIG. 3 is a flow chart of an example of operation of the Minute Maker module 206 during a meeting according to an embodiment of the present invention. In step 302, the module receives an indication that a meeting has commenced. In a following step 304, the module begins to monitor and gather audio stream data from the participants in the meeting. During this stage, the AI engine can identify a number of different participants (e.g., 3 or 4) by their distinct voices. In step 306, a set of parsing heuristics (rules) is selected based on information about the meeting received from the Meeting Manager, such as the meeting committee type. In step 308, the Minute Maker module imports the agenda of the meeting. In step 310, based on the heuristics and the meeting agenda, the module analyzes the audio data and organizes the data using keywords and a format dictated by the heuristics. As will be described more fully below, in a following step 312, the intelligence of the AI engine is used to classify the words and sentences in the audio stream and organize the textual data according to known templates. Participants can prompt the AI engine using particular keywords such as "Agenda change" which indicates that the committee is moving onto a next agenda item, "Executive Session", which temporarily turns of listening by the AI engine, or "AI engine, proceed" to resume AI engine listening. After having analyzed the data, in step 314, the Minute Maker module generates initial long and short of meeting Minutes.

Once the initial meeting Minutes are generated by the AI engine, the process turns over to the participants in the meeting who are given the opportunity to review and edit the text and format options of the long and short versions of the Minutes. The participants provide this feedback via the Meeting Manager to the Minute Maker module, which in step 316, incorporates the changes into the Minutes. Revised Minutes are then generated, and further iterations of the editing process can go on until the Minute Maker module receives an indication from the participants (via the Meeting Module) that initial approval of the minutes has been given (in step 318). In step 320, a flag is set to reopen the Minutes at the next scheduled meeting of the committee to obtain final approval of the Minutes. The method ends in step 322.

Figure 4:
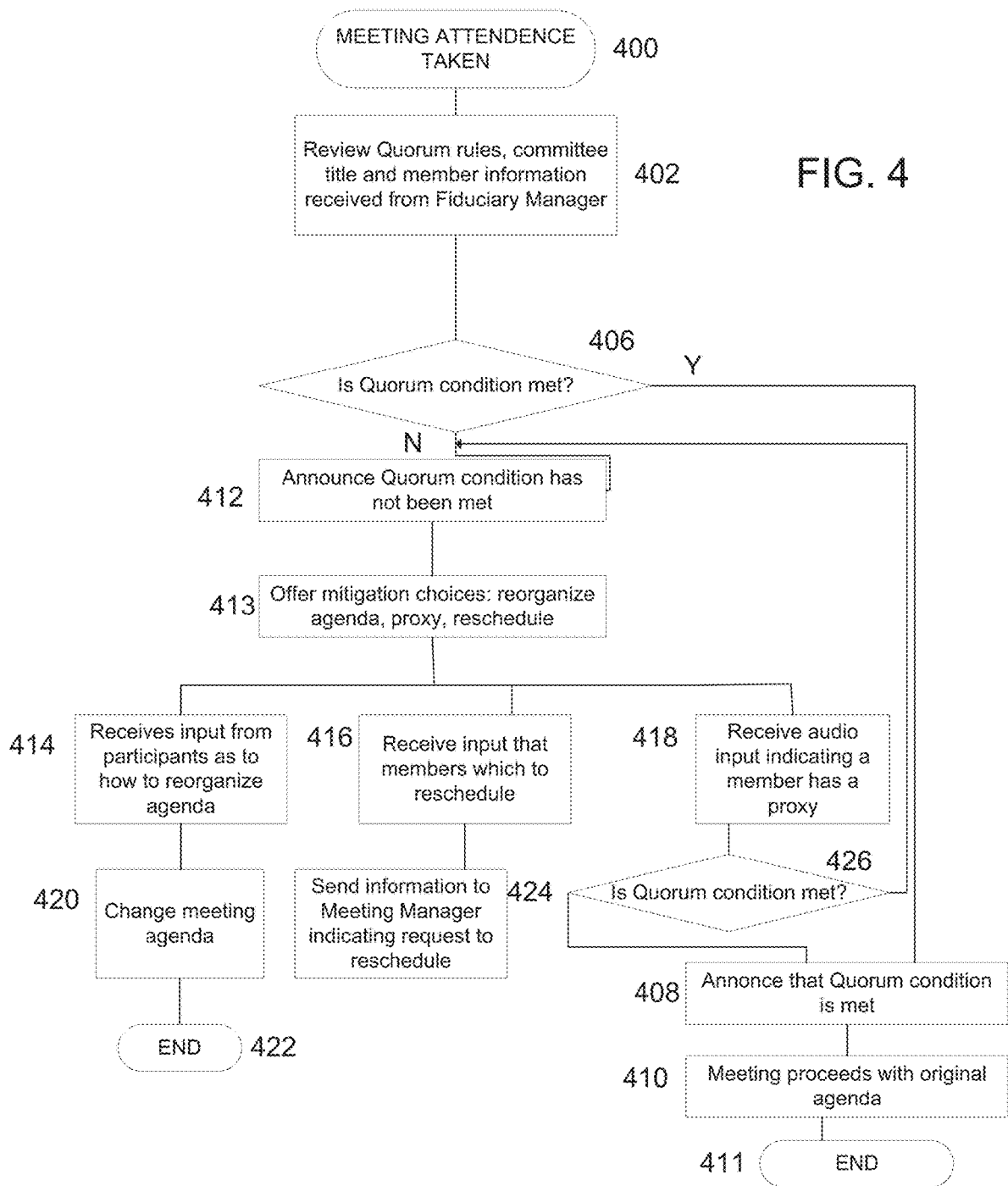
FIG. 4 is a flow chart of a quorum check process according to an embodiment of the present invention.

In addition to the operations discussed above, there are a number of additional specific meeting tasks performed by the AI engine of the Minute Maker Module. These tasks can require a complex dialog between the AI engine and the participants of the meeting and rely upon the natural language processing capabilities of the AI engine. For example, the AI engine makes sure that committee membership is properly updated when a meeting commences, and ensures that Quorum attendance requirements are met. FIG. 4 is a flow chart of an embodiment of a quorum check process facilitated by the Minute Maker module. In an initial step 400, a board committee meeting commences. In step 402, the AI engine review quorum rules, committee title and member information received from the Fiduciary Manager. In step 406, the AI engine determines based on the attendance and the received information whether a quorum is present. If so, in step 408, an announcement is made that the conditions for a quorum have been satisfied, and the meeting proceeds according to a regular agenda in step 410 after which the method ends in step 411. If, on the other hand, it is determined in step 406 that a quorum has not been met, in step 412, the AI announces the Minute Maker announces that a quorum has not been met and, in step 413, presents three options to the current participants: a) reorganize the agenda if a member is expected to arrive soon, b) provide a proxy for an absent member, or c) reschedule the meeting. The participants select one of the three options. The process then branches into three threads depending on the selection of the participants: in step 414, input from the participants to reorganize the agenda is received; in step 416, input that rescheduling is requested is received; and in step 418, input from the participants that a proxy is available is received. In step 420, the AI engine reorganizes the agenda, for example to avoid early votes on resolutions, in response to input from step 414, and the quorum mitigation process ends in step 422. Alternatively, if in step 418, the AI engine receives input that rescheduling is desired by the participants, in step 424, this information is delivered to the Meeting Manager. If, referring to the third branch after step 412, the AI engine receives input that a proxy is being submitted, the AI engine determines, in step 426 whether a quorum has been met by the introduction of the proxy. If so, the process branches to step 408 and an announcement is made that a quorum has been met and the meeting proceeds according to the regular agenda in step 410. If it is determined in step 426 that a quorum still has not been met with the additional proxy, the process cycles back to step 412.

In addition to quorum determining and mitigation, the AI engine of the Minute Maker module mediates voting items, ad hoc resolutions and discussion of new business, and listing of agenda items for subsequent meetings. In each case, the AI engine waits for certain prompts and key words, such as confirmations, to complete required items of the meeting before moving on to further items. The natural language processing capability of the AI engine keeps the meeting on track and ensures that all necessary fiduciary tasks are handled and completed or else specifically flags items that are missing for subsequent completion.

Referring again to FIG. 1, during a meeting, user device (s) 102A, B that are connected to the meeting by direct conference communication or through the Fiduciary.AI portal can receive data objects or files configured to enable display of the meeting agenda on the user devices as arranged by the Meeting Manager. Each of the devices 102A, B can download an application (participant module) tailored to interact with the Fiduciary.ai suite, and the Meeting Manager in particular. The participant module for an allowed administrator can be attributed functionality and capabilities different from those of regular participants. The functionality can be accessed using appropriate administrative login credentials, for example. During a meeting, the participant modules can provide a user interface with menu and activation elements that enable active participation in the meeting via the devices. As one important example, the participant modules can display content allowing the participants to keep track of the current items on the agenda, upcoming agenda items, resolutions, current attendants, etc. In some embodiments, the user interface of the participant modules can be modified based on user preferences. If the agenda includes a vote on a specific measure, devices 102A, B can be configured to display voting icons, to receive user input, such as though clicking on a check box or icon, and to relay this input of the communication meeting to the conference management appliance (i.e., the Meeting Manager). In some implementations, the participant module of the administrative user device 102A can enable the administrator to advance the agenda, selectively initiate ad hoc resolutions, and prevent regular participant devices 102B from transmitting audio data without permission by the administrative device. In general, the functionality of the participant modules gives the administrator in particular a degree of control over the meeting. The AI engine of the Minute Maker monitors input received from the administrator participant module (in addition to audio data received over the communication medium) and modifies its process flow based on the received input.

Figure 5:
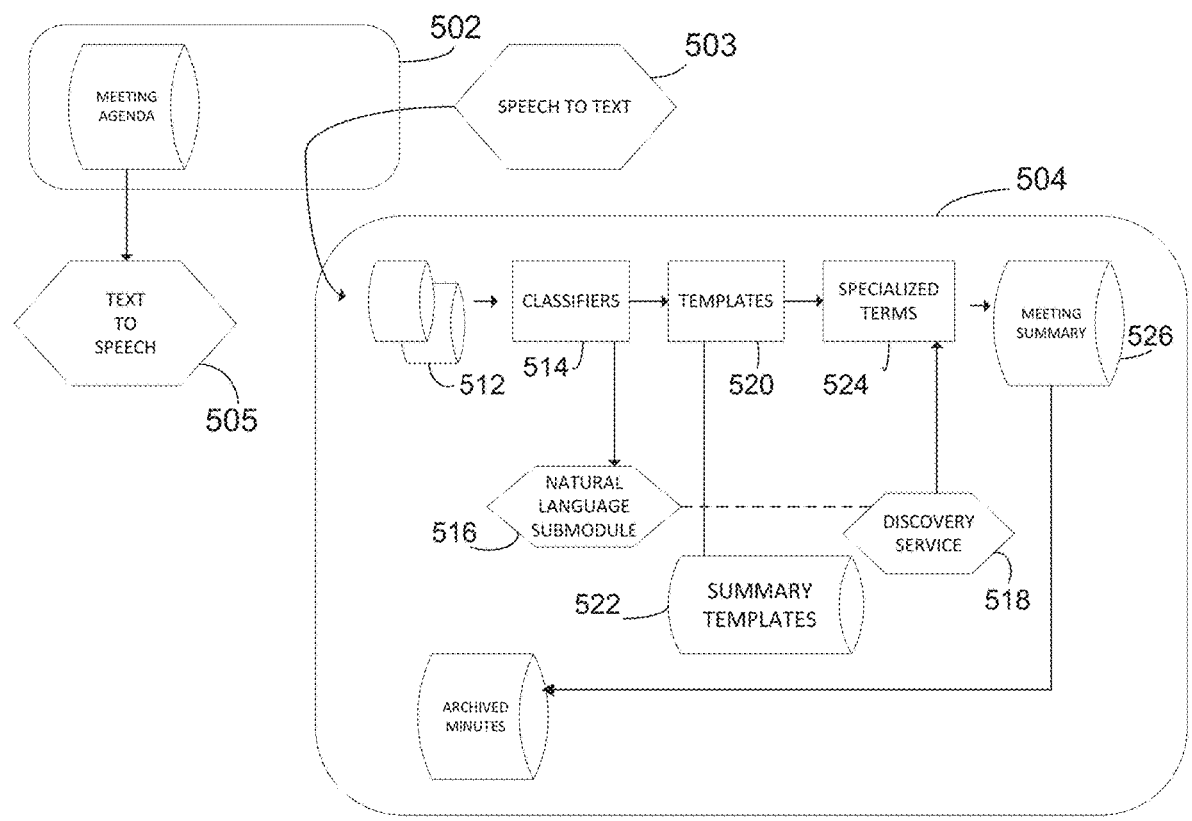
FIG. 5 is a block diagram depicting an embodiment of functional submodules of the Minute Maker module according to an embodiment of the present invention.

FIG. 5 is a block diagram illustrating an embodiment of functional submodules of the Minute Maker module and/or operatively connected to the Minute Maker module. The functionality of the submodules can be divided into two parts, a voice and agenda component 502, and a transcription subsystem 504. The voice and agenda component 502 includes a speech to text submodule 503 that converts audio data, for example, speech of meeting participants, into a text stream. The meeting agenda calendar can be read into the meeting for the participants benefit using a text to speech submodule 505. The audio input from the text to speech module 507 can in turn also be converted into text and appended as a recorded document by the speech to text submodule.

In the transcription subsystem 504, recorded fiduciary documents 512 (e.g., transcriptions of the meeting), and a set of classifiers 514 (e.g., registration information, agenda-related items received form the meeting manager) are used as inputs to a natural language processor 516 of the AI engine. The natural language processor 516 parses the received stream of text into documents into structured data by recognizing the grammatical structures within the text. The recorded fiduciary documents and parsed data are also fed into a discovery submodule 518 which applies various heuristics and rules to gain further insights into the structured data provided by the natural language submodule 516. For example, the discovery submodule 518 can determine a level of confidence that a particular component or extract of the text stream data is relevant to the final summary document. This process can be repeated for each word, phrase, n-gram or text selection extracted from the conference, until all the relevant elements of the text have been identified. Both the natural language submodule 516 and the discovery submodule 518 can be submodules of the AI engine of the Minutes Maker module.

A summary template selection submodule 520, selects a specific summary template from a summary template database 522 in which to format the structured data generated by the natural language submodule. The summary template is selected based on the classifiers and/or other information with the structured data. For example, the template can be chosen based on the fiduciary meeting type. Once the summary template is selected, the template is filled in to create a meeting summary using the structured data with aid of the information gained from the discovery submodule 518. For example, the discovery module may add in or modify specialized terms 524 to be used in the summary. The final output is a proposed meeting summary document 526 which is sent to participants for approval.

Figure 6:
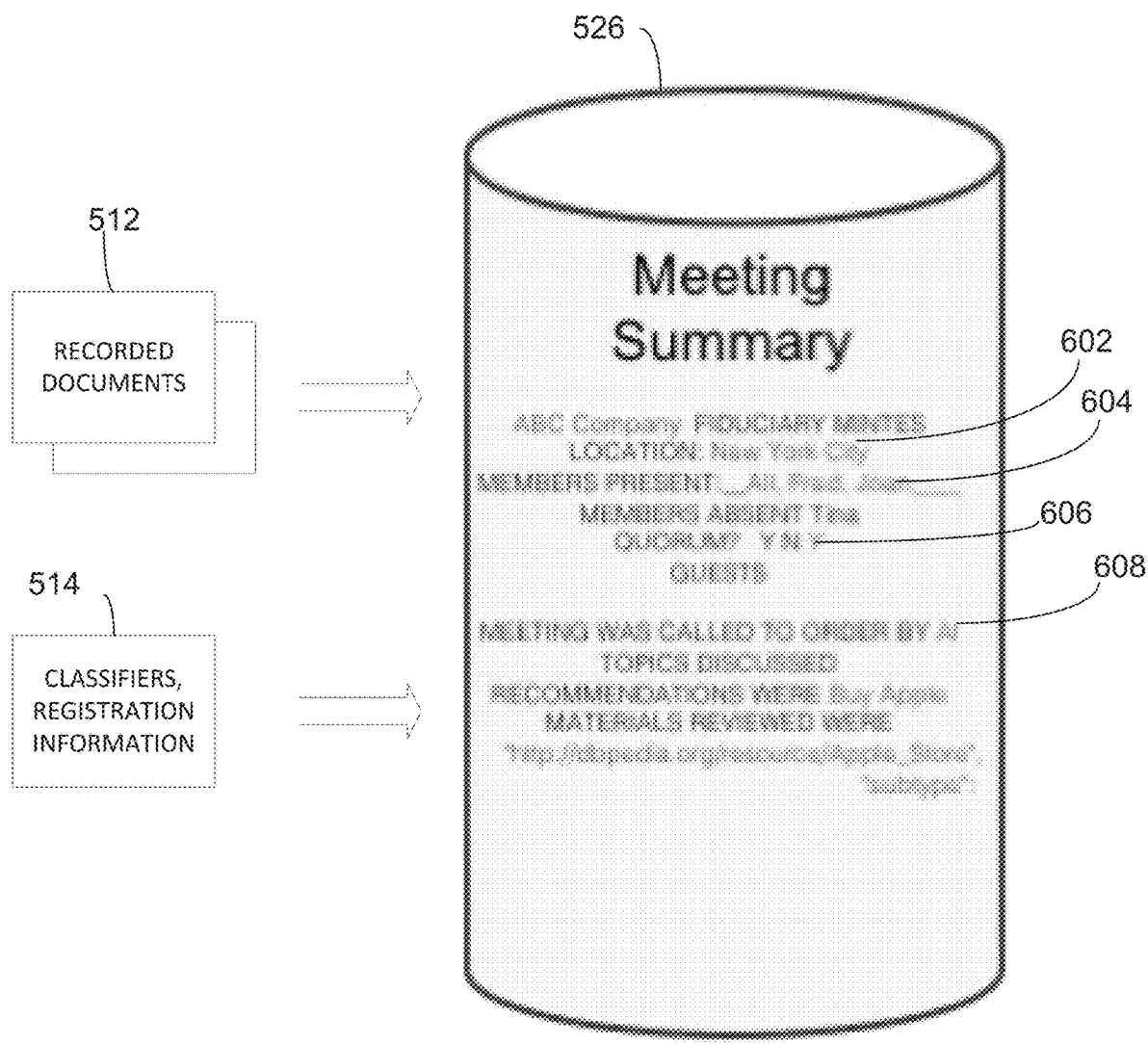
FIG. 6 is a schematic illustration of a meeting summary generation process.

FIG. 6 shows a schematic illustration of the meeting summary generation process. The input data includes recorded documents such as a text stream of the meeting 512 and various classifiers 514 including registration information. The meeting summary includes a number of informational fields 602, 604, 606, 608 such as "LOCATION", "MEMBERS PRESENT", "QUORUM? YN" and "MEETING WAS CALLED TO ORDER BY" among others. Each of these fields is filled in with data extracted from the input (transcribed) documents and data. For example, "New York City" is filled in for the "LOCATION" field, "All, Fred, Josh" is filled in for the "MEMBERS PRESENT" item, "Y" is filled in for the "QUORUM YN?" field, and "Al" is filled in for the "MEETING WAS CALLED TO ORDER BY" field. It is noted that the fields, format, and the order in which the fields are displayed in the meeting summary in FIG. 6 are merely exemplary, and different fields, formats and orders can be used.

Figure 7:
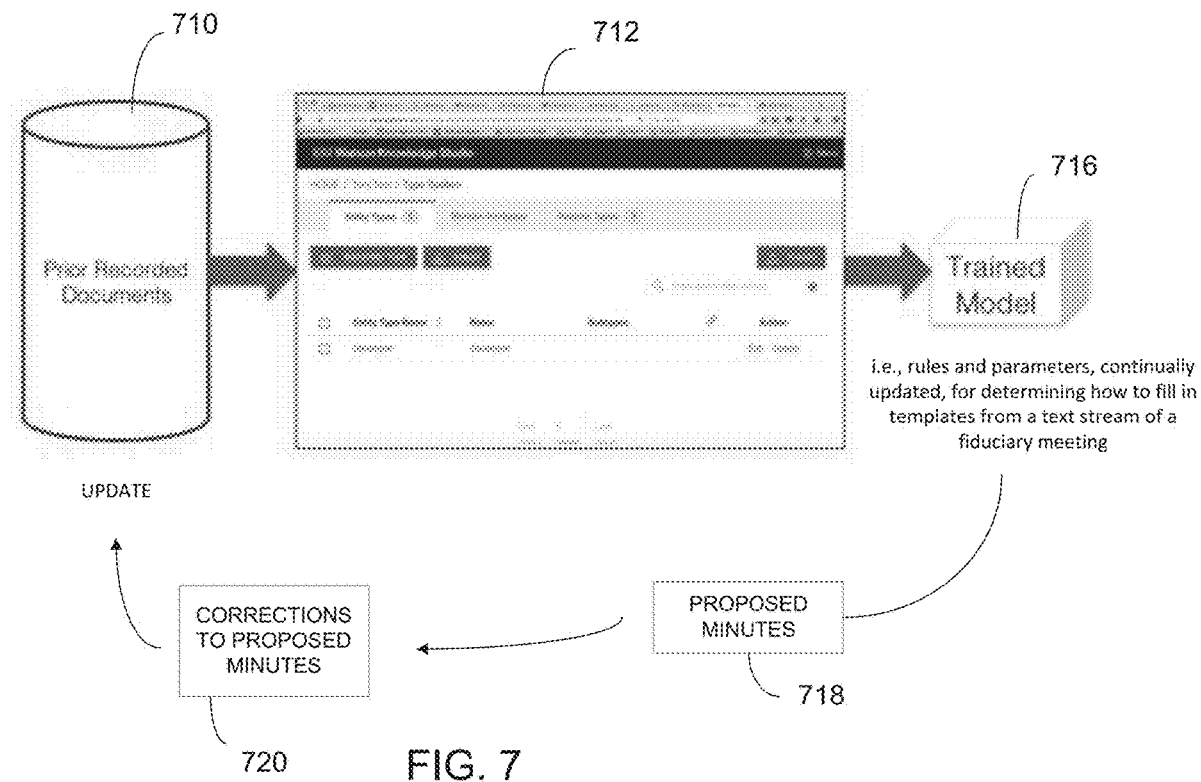
FIG. 7 is a schematic diagram showing input and output of a machine learning process for meeting minute generation according to an embodiment of the present invention.

Referring again to FIG. 5, the discovery submodule 518 uses machine learning algorithms to continually refine and update the criteria used to convert the text stream of a meeting into meeting minutes and minute summaries. FIG. 7 is a schematic diagram showing the input and output of the machine learning process for meeting minute generation according to an embodiment of the present invention. Any relevant prior recorded documents 710, including previously approved fiduciary meeting minutes comprise the input data set used for training. The discovery module analyzes 712 the prior recorded documents (AI engine) and determines a trained model 716 for meeting minute generation. The trained model includes heuristics, rules and parameters, optimized based on the current data (the current database of prior recorded documents 710), for generating the meeting minutes. Using the trained model, the AI engine can generate proposed meeting minutes or summaries 718. Participants can make suitable corrections 720 to the proposed minutes. Once corrections have been made, the document can be added to the prior recorded documents as a candidate document for training the learning system. Through this process, which is continually updated, the AI engine learns based on the "experience" of a collected set of approved recorded meeting minute documents.

Returning again to FIG. 1, according to a particular implementation, the conference management appliance 106 can communicate directly with the administrative user device 102A and one or more participant user devices 102B via the meeting manager module. The Meeting Manager 204 in conjunction with the Minutes Manager 208 can send notifications to at least the administrative user device 102A based on agenda status and user actions. The Meeting Manager can identify compliance with the requirements of the organizational meeting. For example, Meeting Manager 204 can constantly monitor the conference and extracting from the participants data to compare against a pre-trained evaluative AI model of compliance with a given topic or issue. Where the comparison of the extracted keywords or text from the conference is not indicative that the present agenda item has been addressed the Meeting Manager is configured to send a notification to at least the administrative user device 102A indicating that the present agenda item has not been resolved. In one or more implementations, if the Meeting Manager has determined that an agenda item has not been resolved, based on a comparison of the extracted text to the data model, the administrative user device 102A is prevented from advancing to the next agenda item.

As a more detailed example, the Meeting Manager 204 is configured to receive action events registered by the user devices. For instance, when the user of the administrative user device 102A selects "next item" from the administrative display, that action is first sent to Meeting Manager. The administrative user device 102 waits until a pass condition or value is received from the conference management appliance 106. If the conference management appliance 106 determines that the present agenda item has not been resolved, based on the comparison of the parsed data to a pre-existing model, a fail condition is sent to the administrative user device 102A and the agenda item is not advanced.

By way of a further non-limiting example, the conference management appliance 106 is configured by the Meeting Manager 204 to identify if the conference participants have not voted on a specific measure required by the agenda, or discussed a specific resolution required by the agenda. In this context, the conference management appliance 106 is configured to prompt the administrative user device 102A and one or more participant user devices 102B to address the missed item before the next item of the agenda is addressed. In one alternative implementation, the conference management appliance 106 sends a notification only to the administrative user device 102A indicating that an agenda item has not been resolved. Upon receipt of a fail condition, the administrative user device can provide a notification to the user that the current item has not been resolved. In a particular implementation, the user of the administrative user device 102A can advance the agenda upon indicating that the user is aware of the uncompleted item. In an alternative implementation, the user of the administrative user device 102A is prevented from advancing the agenda until the present agenda item is resolved.

As discussed above, once each item of the agenda has been discussed or voted upon, the conference concludes and the Minutes Maker is configured to generate a record of the conference and actions taken during the conference that is in compliance with a given organizations' rules or legal obligations in short (summary) and/or long (complete) form.

The generated minutes are sent to the at least the administrative user device 102A, and preferably to all meeting participants for review and editing. The administrative user device 102A is configured by a document editing module 306 to edit the received document and mark it a final version. The preliminarily accepted version of the text document, at this point still not finally approved, is sent back to the Minutes Manager of the conference management appliance 106 for storage. At the next scheduled conference for a particular organization, the stored text document can be retrieved and presented to each of the users participating in the conference. Upon a vote, recorded by the conference management appliance 106, the minutes can be finally approved and saved again to the Minutes Archive 310.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is to describe particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems are cited throughout this application, the disclosures of which are incorporated herein by reference. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the claims that follow, the respective features recited in those points, and by equivalents of such features.

I claim:

1. A method of memorializing a fiduciary meeting among a plurality of participants comprising:
receiving a transcription text of a fiduciary meeting discussion among the plurality of participants;
parsing the transcription text into structured data using natural language processing by recognizing grammatical structures in the transcription text;
determining a template for organizing the parsed text;
filling the template with the parsed text according to rules determined at least in part using a machine learning model applied to previously generated fiduciary meeting documents;
generating a minutes document that memorializes the fiduciary meeting;
receiving corrections from at least one of the plurality of participants for modifying the generated minutes document;
adding the corrections to the minutes document to fully memorialize the fiduciary meeting;
training the machine learning model based on the corrections to the minutes document;
determining whether a quorum condition has been met for conducting the fiduciary meeting;

receiving input from the plurality of participants that at least one of the participant has a proxy for an absent committee member if a quorum has not been achieved;

determining whether the proxy is legitimate; and announcing that a quorum has been met if the proxy is sufficient to meet the quorum condition.

2. The method of claim 1, further comprising:

prior to parsing, applying classifiers to the received transcription text based on information related to the fiduciary meeting.

3. The method of claim 2, wherein the classifiers include a meeting committee type, and an identity of registered participants.

4. The method of claim 1, wherein the generated minutes document includes transcriptions of speech from the plurality of participants, voting results for resolutions, and a meeting agenda.

5. The method of claim 1, wherein the step of parsing is performed, at least in part, using heuristics based on information related to the fiduciary meeting.

6. The method of claim 5, wherein the information related to the fiduciary meeting includes a meeting committee type.

7. The method of claim 1, further comprising:

receiving input from the plurality of participants to reorganize an agenda of the fiduciary meeting if a quorum has not been achieved; and changing the meeting agenda based on the received input.

8. The method of claim 1, further comprising:

receiving input from the plurality of participants to reschedule the fiduciary meeting if a quorum has not been achieved; and rescheduling the meeting using a fiduciary calendar based on the received input.

* * * * *